US008233950B2

(12) United States Patent
Hobson et al.

(10) Patent No.: US 8,233,950 B2
(45) Date of Patent: Jul. 31, 2012

(54) WIRELESS PORTABLE DEVICE WITH REDUCED RF SIGNAL INTERFERENCE

(75) Inventors: Phillip M. Hobson, Menlo Park, CA (US); Robert J. Hill, Salinas, CA (US); Robert W. Schlub, Campbell, CA (US); Juan Zavala, Watsonville, CA (US); Tang Yew Tan, San Francisco, CA (US); Richard Hung Minh Dinh, San Jose, CA (US); Kenneth A. Jenks, Cupertino, CA (US); Robert Sean Murphy, Sunnyvale, CA (US); Erik L. Wang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1158 days.

(21) Appl. No.: 11/968,331

(22) Filed: Jan. 2, 2008

(65) Prior Publication Data

US 2008/0167073 A1 Jul. 10, 2008

Related U.S. Application Data

(60) Provisional application No. 60/883,587, filed on Jan. 5, 2007.

(51) Int. Cl.
*H04M 1/00* (2006.01)

(52) U.S. Cl. ... 455/575.5; 455/63.1; 455/82; 455/550.1; 455/562.1; 455/575.7; 343/714; 343/718; 343/782

(58) Field of Classification Search ................. 455/63.1, 455/82, 550.1, 562.1, 575.5–575.7, 90.3, 455/97, 100; 343/714, 718, 782
See application file for complete search history.

(56) References Cited

U.S. PATENT DOCUMENTS

| | | | | |
|---|---|---|---|---|
| 6,501,945 | B1 * | 12/2002 | Chien | 455/296 |
| 7,712,669 | B2 * | 5/2010 | Mahany et al. | 235/472.02 |
| 2003/0040338 | A1 | 2/2003 | Saito | |
| 2003/0104728 | A1 * | 6/2003 | Inagawa et al. | 439/610 |
| 2004/0017318 | A1 | 1/2004 | Annabi et al. | |
| 2005/0026660 | A1 * | 2/2005 | Park et al. | 455/575.5 |
| 2006/0234788 | A1 * | 10/2006 | Chuang et al. | 455/575.7 |
| 2008/0018544 | A1 * | 1/2008 | Rozan | 343/713 |
| 2010/0123642 | A1 * | 5/2010 | Sanz et al. | 343/893 |

FOREIGN PATENT DOCUMENTS

| | | | |
|---|---|---|---|
| EP | 1 324 430 | A2 | 7/2003 |
| JP | 2002-246935 | A | 8/2002 |
| WO | WO 03/030297 | A1 | 4/2003 |

* cited by examiner

*Primary Examiner* — Dai A Phuong
(74) *Attorney, Agent, or Firm* — Kilpatrick Townsend & Stockton LLP

(57) ABSTRACT

A handheld device may include one or more antennas and a connector both disposed at a base of the handheld device. The connector may have a shell comprising a conductive material. The connector shell may include at least one opening in a portion of the conductive material to reduce electromagnetic interference between the connector shell and the one or more antennas.

24 Claims, 13 Drawing Sheets

| Pin | Signal Name | I/O | Function |
|---|---|---|---|
| 1 | DGND | GND | Digital ground in mobile device. |
| 2 | DGND | GND | Digital ground in mobile device. |
| 3 | TPA+ | I/O | FireWire signal |
| 4 | USB D+ | I/O | USB signal |
| 5 | TPA– | I/O | FireWire signal |
| 6 | USB D– | I/O | USB signal |
| 7 | TPB+ | I/O | FireWire signal |
| 8 | USB Vbus | I | USB power in; used to detect a USB host. |
| 9 | TPB– | I/O | FireWire signal |
| 10 | Accessory Identify | I | Identify external accessory |
| 11 | F/W PWR+ | I | FireWire and charger input power (8 V to 15 V DC) |
| 12 | F/W PWR+ | I | FireWire and charger input power (8 V to 15 DC) |
| 13 | Accessory Power | O | 3.3 V is the nominal output. Nominal current in low power mode is 5 mA, with current limited to 100 mA in high power mode. |
| 14 | Reserved | | |
| 15 | DGND | GND | Digital ground in mobile device. |
| 16 | DGND | GND | Digital ground in mobile device. |
| 17 | Reserved | | |
| 18 | RX | I | Receive data |
| 19 | TX | O | Transmit data |
| 20 | Accessory Detect | I | Accessory Detect |
| 21 | S Video Y | O | Luminance component of S video. |
| 22 | S Video C | O | Chrominance component of S video. |
| 23 | Composite Video | O | Composite signal |
| 24 | Remote Sense | I | Detect remote |
| 25 | LINE-IN L | I | Line level input to the mobile device for the left channel. |
| 26 | LINE-IN R | I | Line level input to the mobile device for the right channel. |
| 27 | LINE-OUT L | O | Line level output to the mobile device for the left channel. |
| 28 | LINE-OUT R | O | Line level output to the mobile device for the right channel. |
| 29 | Audio Return | — | Audio return. This is a signal and should never be grounded inside the accessory. |
| 30 | DGND | GND | Digital ground in mobile device. |
| 31 | Chassis | | Chassis ground for connector shell. |
| 32 | Chassis | | Chassis ground for connector shell. |

*FIG. 11*

WIRELESS PORTABLE DEVICE WITH REDUCED RF SIGNAL INTERFERENCE

CROSS-REFERENCES TO RELATED APPLICATIONS

This application claims the benefit of U.S. Provisional Application No. 60/883,587, filed Jan. 5, 2007, which is incorporated herein by reference in its entirety for all purposes.

BACKGROUND OF THE INVENTION

One concern with use of wireless mobile devices such as cellular telephones is the effect such devices have on human health. The Federal Communications Commission (FCC) requires that all wireless telephones, including cellular and Personal Communications Services (PCS) telephones sold in the United States, meet particular guidelines including Specific Absorption Rate (SAR).

One way to reduce SAR is by placing the antenna in a region of the wireless device farthest from the upper head of a user. In wireless handheld devices such as cell phones, this often means placing the antenna at the base of the handset instead of near the top as is traditionally done. In some handheld devices, the connector serving as the interface for power and data transmission is also located at the base of the device. Because connectors typically have a conductive shell, the connector can cause interference with the antenna operation if the antenna and the connector are placed in close proximity.

With the antenna at the base of the handheld device, some handheld device manufacturers have moved the connector to an upper portion of the handheld device to minimize interference with the antenna operation. However, placing the connector in an upper portion of the handheld device eliminates the ability to dock the device in a docking system such as a stand-alone docking station, a Hi-Fi audio system with integrated docking station, or a cradle.

Thus, there is a need for techniques which facilitate disposing both the antenna(s) and the connector at the base of a handheld device without adversely impacting the operation of the antenna(s).

BRIEF SUMMARY OF THE INVENTION

In accordance with an embodiment of the invention, a handheld device may include one or more antennas and a connector all disposed at a base of the handheld device. The connector may have a shell comprising a conductive material. The connector shell may include at least one opening in a portion of the conductive material to reduce electromagnetic interference between the connector shell and the one or more antennas.

In one embodiment, the at least one opening may be covered by a non-conductive material. In another embodiment, the connector may be configured to facilitate docking of the handheld device in a docking system. In yet another embodiment, the connector may be positioned between the one or more antennas and a front face of the handheld device where a keypad is located. In still another embodiment, the handheld device may be configured such that when it is used as a cellular phone, the base of the handheld device is away from user's upper head.

In yet another embodiment, the connector shell may include an upper plate, a lower plate and two side plates with the upper plate extending between the lower plate and the one or more antennas. The one or more openings in a portion of the conductive material may be in the upper plate of the handheld device. In one embodiment, each end plate of the connector shell may include at least one opening in the conductive material. The handheld device may further include a flex circuit configured to make electrical contact with one or more pins of the connector along the lower plate. The flex circuit may extend out from under the bottom plate along one of the two side plates.

In still another embodiment, the handheld device may include a plurality of electronic components coupled to the flex circuit directly beneath the connector.

Further features of the invention, its nature and various advantages will be more apparent from the accompanying drawings and the following detailed description of embodiments of the invention.

BRIEF DESCRIPTION OF THE DRAWINGS

FIG. 11 shows an exemplary pin assignment for connector 412 in FIG. 4;

DETAILED DESCRIPTION OF THE INVENTION

In accordance with embodiments of the invention, a connector and one or more antennas of a wireless portable device such as a handheld device may be disposed at the base of the device. Interference with antenna operation may be minimized using a number of techniques. In one embodiment wherein the shell of the connector comprises a conductive material, at least one opening may be formed in the conductive material to reduce RF interference with the antenna(s). In another embodiment, a substrate such as a flex circuit which electrically may connect the pins of the connector to electronic circuit components inside the handheld device may be routed through an end of the connector and away from a center region of the antenna(s). In yet another embodiment, electronic components, such as resistors, capacitor, and inductors may be coupled to the flex circuit directly beneath the connector such that the connector may be positioned between the antenna(s) and the electronic components. These and other techniques described more fully next help reduce interference with the operation of the antenna and provide other advantages and features.

Portable devices may be small portable computers such as those sometimes referred to as ultra-portables. Portable devices may also be somewhat smaller devices. Examples of smaller portable devices include wrist-watch devices, pendant devices, headphone and earpiece devices, and other wearable and miniature devices. One category of portable devices is handheld devices. The invention is described in the context of handheld devices, however, the invention may be implemented in any suitable portable electronic device.

Handheld devices may be, for example, cellular telephones, media players with wireless communications capabilities, handheld computers (also sometimes called personal digital assistants), remote controllers, global positioning system (GPS) devices, and handheld gaming devices. The handheld devices of the invention may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples.

Figure 1:
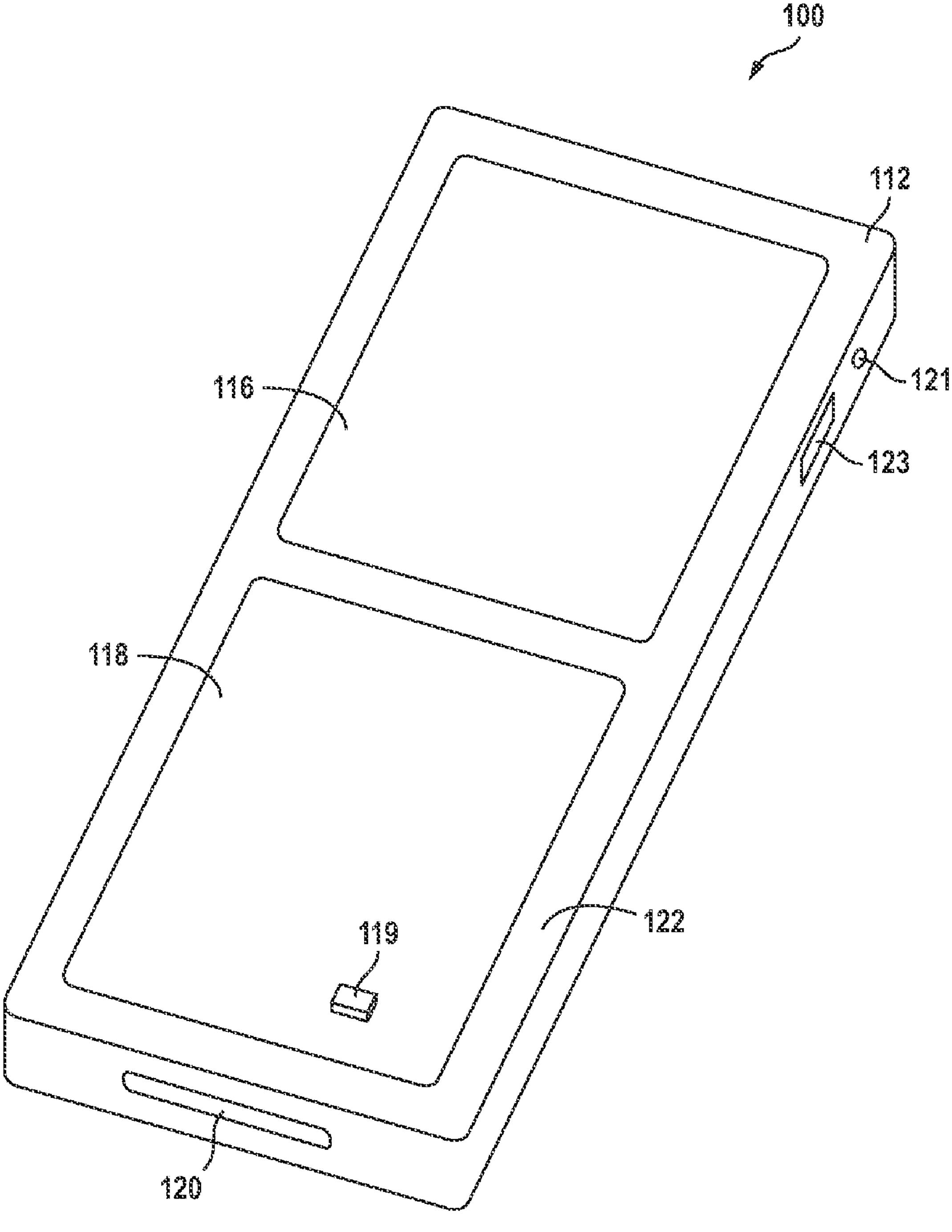
FIG. 1 is a perspective view of a wireless handheld device in accordance with an embodiment of the invention.

An illustrative wireless handheld device 100 in accordance with an embodiment of the invention is shown in FIG. 1. Handheld device 100 may include housing 112 and at least one antenna (not shown). Housing 112, sometimes referred to as a case, may be formed of any suitable materials including, plastic, wood, glass, ceramics, metal, or other suitable materials, or a combination of these materials. In some embodiments, housing 112 may be a dielectric or other low-conductivity material, so that the operation of conductive antenna elements that are located in proximity to housing 112 is not disrupted. In other embodiments, housing 112 may be formed from metal elements that serve as antenna elements.

The antenna(s) in device 100 may have a ground element (sometimes called a ground) and a resonant element (sometimes called a radiating element or antenna feed element). Antenna terminals, sometimes referred to as the antenna's ground and feed terminals, may be electrically connected to the antenna's ground and resonant element, respectively.

Handheld device 100 may have input-output devices such as a display screen 116, buttons such as button 123, user input control devices 118 such as button 119, and input-output components such as port 120 and input-output jack 121. Display screen 116 may be, for example, a liquid crystal display (LCD), an organic light-emitting diode (OLED) display, a plasma display, or multiple displays that use one or more different display technologies. As shown in the example of FIG. 1, display screens such as display screen 116 can be mounted on front face 122 of handheld electronic device 100. If desired, displays such as display 116 can be mounted on the rear face of handheld electronic device 100, on a side of device 100, on a flip-up portion of device 100 that is attached to a main body portion of device 100 by for example a hinge, or using any other suitable mounting arrangement.

A user of handheld device 100 may supply input commands using user input interface 1 18. User input interface 118 may include buttons (e.g., alphanumeric keys, power on-off, power-on, power-off, and other specialized buttons), a touch pad, pointing stick, or other cursor control device, a touch screen (e.g., a touch screen implemented as part of screen 116), or any other suitable interface for controlling device 100. Although shown schematically as being formed on the top face 122 of handheld electronic device 100 in the example of FIG. 1, user input interface 118 may generally be formed on any suitable portion of handheld electronic device 100. For example, a button such as button 123 (which may be considered to be part of input interface 118) or other user interface control may be formed on the side of handheld electronic device 100. Buttons and other user interface controls can also be located on the top face, rear face, or other portion of device 100. If desired, device 100 can be controlled remotely (e.g., using an infrared remote control, a radio-frequency remote control such as a Bluetooth remote control). In one embodiment wherein device 100 has cellular phone capability, a speaker (not shown) and a microphone (not shown) may be housed in appropriate locations inside housing 112.

Handheld device 100 may have ports such as bus connector 120 and jack 121 that allow device 100 to interface with external components. Typical ports include power jacks to recharge a battery within device 100 or to operate device 100 from a direct current (DC) power supply, data ports to exchange data with external components such as a personal computer or peripheral, audio-visual jacks to drive headphones, a monitor, or other external audio-video equipment. The functions of some or all of these devices and the internal circuitry of handheld electronic device can be controlled using input interface 118.

Figure 2:
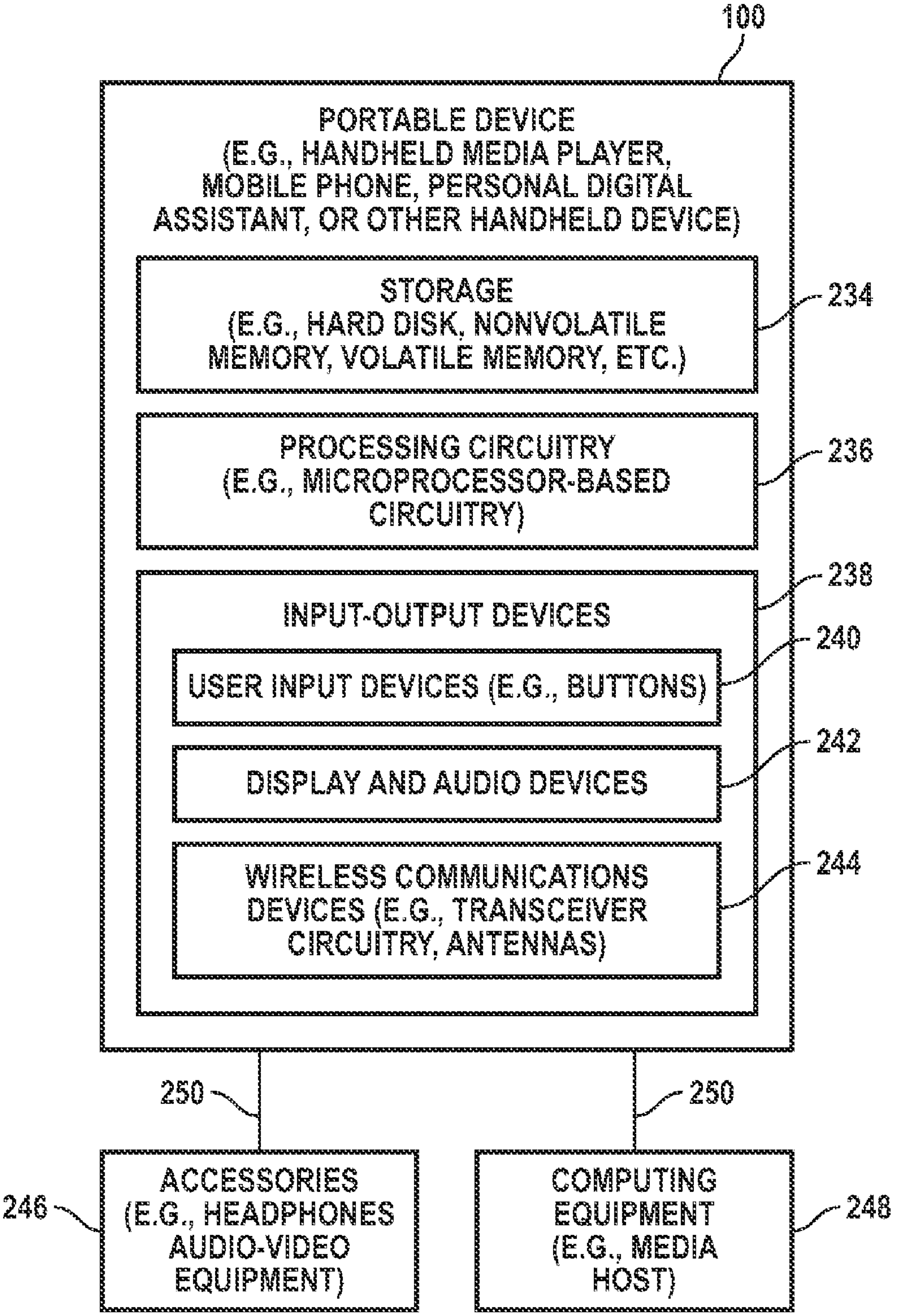
FIG. 2 is a schematic diagram of a wireless handheld device in accordance with an embodiment of the invention.

A schematic diagram of an illustrative handheld device with wireless capability is shown in FIG. 2. Handheld device 100 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 100 includes storage 234 which in turn may include one or more different types of storage such as hard disk drive storage, nonvolatile semiconductor memory (e.g., NAND and/or NOR varieties of flash memory, EPROM, EEPROM and/or ROM), volatile memory (e.g., SRAM, DRAM, battery-backed SRAM and/or battery-backed DRAM). Processing circuitry 236 may be used to control the operation of device 100. Processing circuitry 236 may be based on a processor such as a microprocessor and/or a graphics processor and other suitable processor integrated circuits.

Input-output devices 238 may be used to allow data (e.g., text, video, audio) to be supplied to and from device 100. Display screen 116 and user input interface 118 of FIG. 1 are examples of input-output devices 238. Input-output devices 238 can include user input-output devices 240 such as buttons, touch screens, joysticks, click wheels, scrolling wheels, touch pads, key pads, keyboards, microphones, and cameras. A user can control the operation of device 100 by supplying commands through user input devices 240. Display and audio devices 242 may include liquid-crystal display (LCD) screens, light-emitting diodes (LEDs), and other components that present visual information and status data. Display and audio devices 242 may also include audio equipment such as microphone, speakers. Display and audio devices 242 may contain audio-video interface equipment such as jacks and other connectors for external headphones, monitors and other equipment.

Wireless communications devices 244 may include communications circuitry such as radio-frequency (RF) transceiver circuitry formed from one or more integrated circuits, power amplifier circuitry, passive RF components, antennas (internal and/or external) and other circuitry for handling RF wireless signals. Wireless signals can also be sent using light (e.g., using infrared communications).

Device 100 can communicate with external devices such as accessories 246 and computing equipment 248 via paths 250. Paths 250 may include wired and wireless paths. Accessories 246 may include headphones (e.g., wired or wireless cellular headset and audio headphones) audio-video equipment (e.g., wireless speakers, Hi-Fi systems with integrated docking station, a game controller, or other equipment that receives and plays audio and video content), and stand-alone docking stations. Computing equipment 248 may be a server from which songs, videos, or other media are downloaded wirelessly. Computing equipment 248 may also be a local host (e.g., a user's own personal computer), from which the user obtains a wireless download of music or other media files.

The wireless communications devices 244 may be used to cover communications frequency bands such as the cellular telephone bands at 850 MHz, 900 MHz, 1800 MHz, and 1900 MHz, the global positioning system (GPS) band at 1575 MHz, data service bands such as the 3G data communications band at 2170 MHz band (commonly referred to as UMTS or Universal Mobile Telecommunications System), the WiFi® (IEEE 802.11) band at 2.4 GHz, and the Bluetooth® band at 2.4 GHz. These are merely illustrative communications bands over which wireless communications devices 244 may operate. Additional bands are expected to be deployed in the future as new wireless services are made available. Wireless communications devices 244 may be configured to operate over any suitable band or bands to cover any existing or new wireless services of interest. If desired, multiple antennas may be provided in wireless communications devices 244 to cover more bands or one or more antennas may be provided with wide-bandwidth resonating element(s) to cover multiple communications bands of interest. An advantage of using a broadband antenna design that covers multiple communications bands of interest is that this type of approach makes it possible to reduce device complexity and cost and to minimize the volume within a handheld device that is allocated to antenna structures.

A broadband design may be used for one or more antennas in wireless communications devices 244 when it is desired to cover a relatively larger range of frequencies without providing numerous individual antennas or using a tunable antenna arrangement. If desired, a broadband antenna design may be made tunable to expand its bandwidth coverage or may be used in combination with additional antennas. In general, however, broadband designs tend to reduce or eliminate the need for multiple antennas and tunable configurations. Exemplary embodiments of broad band antennas that may be advantageously integrated with the handheld device of the present invention are described in more detail in reference to FIGS. 12-16 further below.

Because electronic components such as a connector, display and PCB often contain large amounts of metal (e.g., as radio-frequency shielding in the case of display and PCB), the location of these components relative to the antenna elements in device 100 need to be taken into consideration. Suitably chosen locations for the antenna elements and electronic components of the device can allow the antenna of handheld electronic device 100 to function properly without being disrupted by the electronic components.

It may be desirable to dispose the antenna(s) at the base of the handheld device to, for example, reduce the specific absorption rate (SAR). It may also be desirable to dispose the connector, which provides the electrical interface with external accessories and other devices, at the base of the handheld device as depicted by port 120 in FIG. 1. This can enable device 100 to be docked in a docking system. However, as stated above, because connectors typically have a conductive housing (e.g., comprising metal), its proximity with the antenna(s) at the base of device 100 can cause interference with proper operation of the antenna(s).

Figure 3:
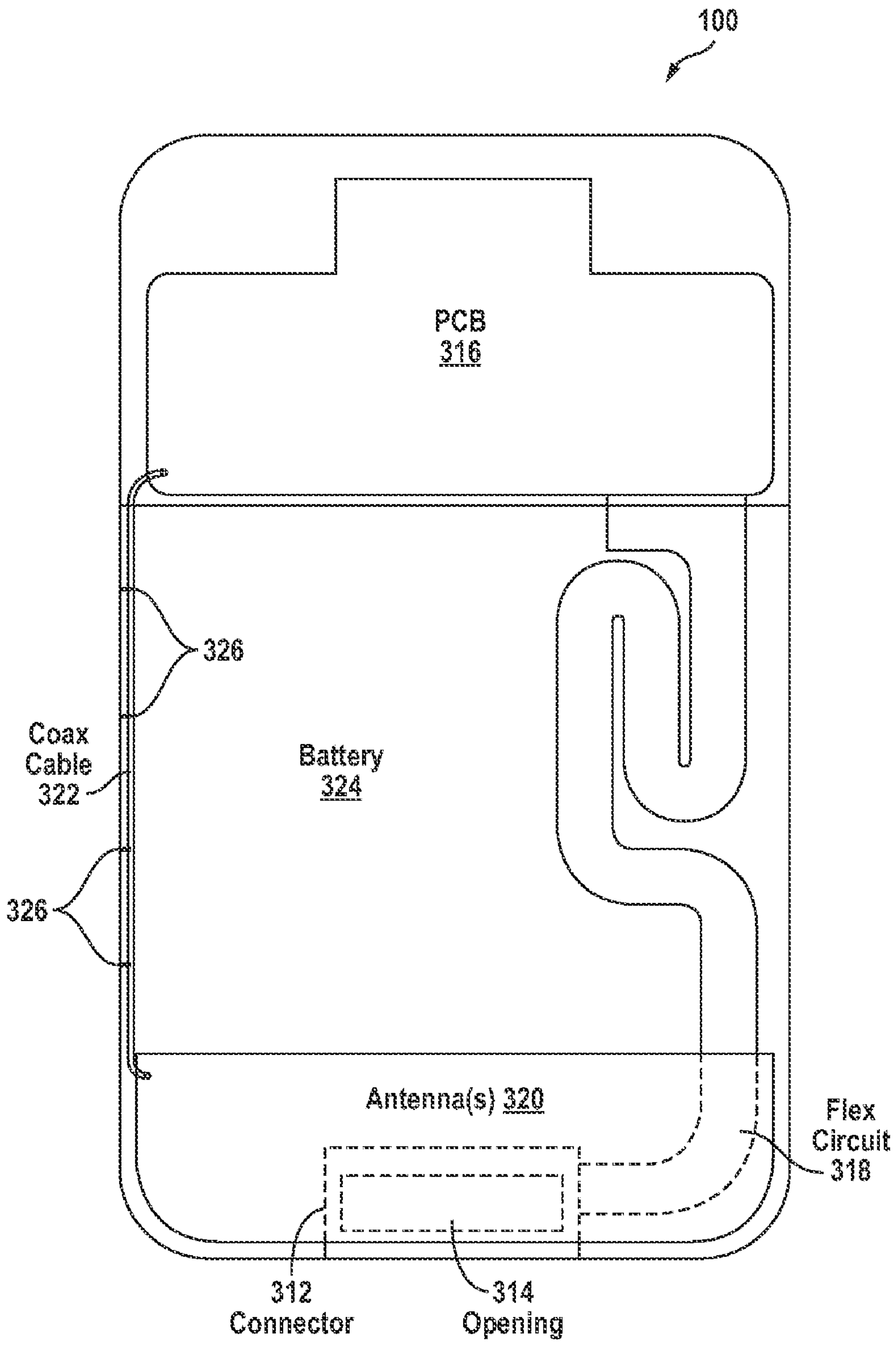
FIG. 3 is a plan view of an interior portion of a wireless handheld device in accordance with an embodiment of the invention.

FIG. 3 is a plan view of a wireless handheld device 100 showing the location of few of the components in the wireless device, in accordance with an embodiment of the invention. As shown, a circuit board 316 can be disposed in an upper portion of handheld device 100, a battery 324 can be located in a middle portion, and a connector 312 together with one or more antennas can be housed at the base of device 100. The region marked with reference numeral 320 designates the region in which the resonating element(s) of one or more antennas can be located. The shape of region 320 does not necessarily correspond to the shape of any particular element (s) of the antenna(s). Exemplary antenna systems suitable for use in handheld device 100 are described in reference to FIGS. 12-16 further below.

A substrate 318 having conductive traces (e.g., a flexible circuit) can be used to connect electrodes or pins in connector 312 to circuit board 316. In FIG. 3, which is intended to provide a view through the backside of device 100 (i.e., the side opposite the front side where the display is located), connector 312 can be located under antenna(s) 320 along the dimension into the page. When handheld device 100 is used as a cellular phone, the upper portion of handheld device 100 can be closest to the user's head. Thus, the component configuration in device 100 can advantageously keep the antenna (s) furthest from a user's head, and can also enable device 100 to be docked in a docking system. Connector 312 can have a shell comprising a conductive material such as a metal. As shown, an opening 314 can be formed in the conductive material of the shell to minimize interference with the operation of the antenna(s). Features of connector 412 are described more fully with reference to FIGS. 4, 5A, 5B and 6.

Figure 4:
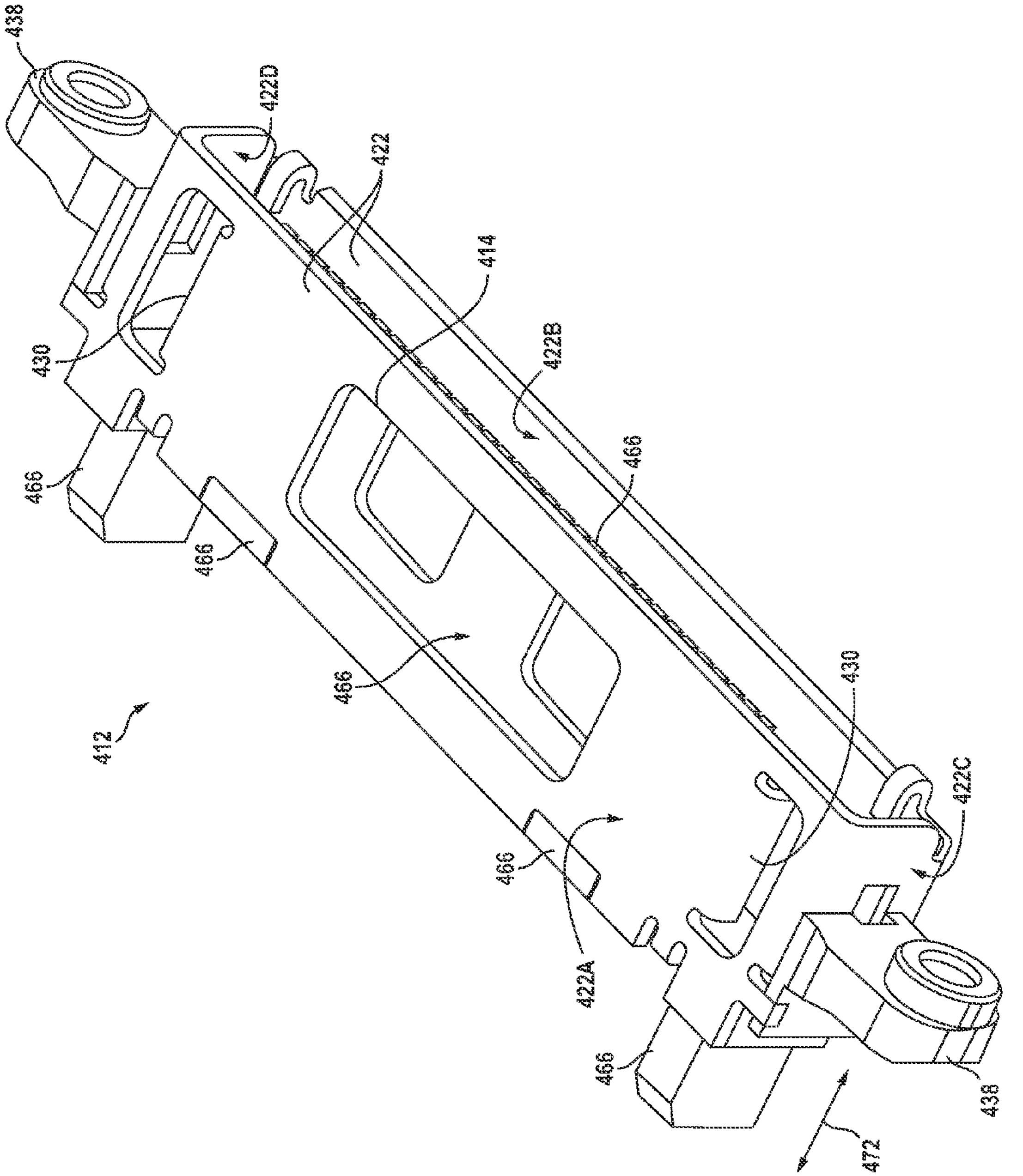
FIG. 4 is a perspective view of a front side of an exemplary mobile device connector in accordance with an embodiment of the invention.
Figure 5A:
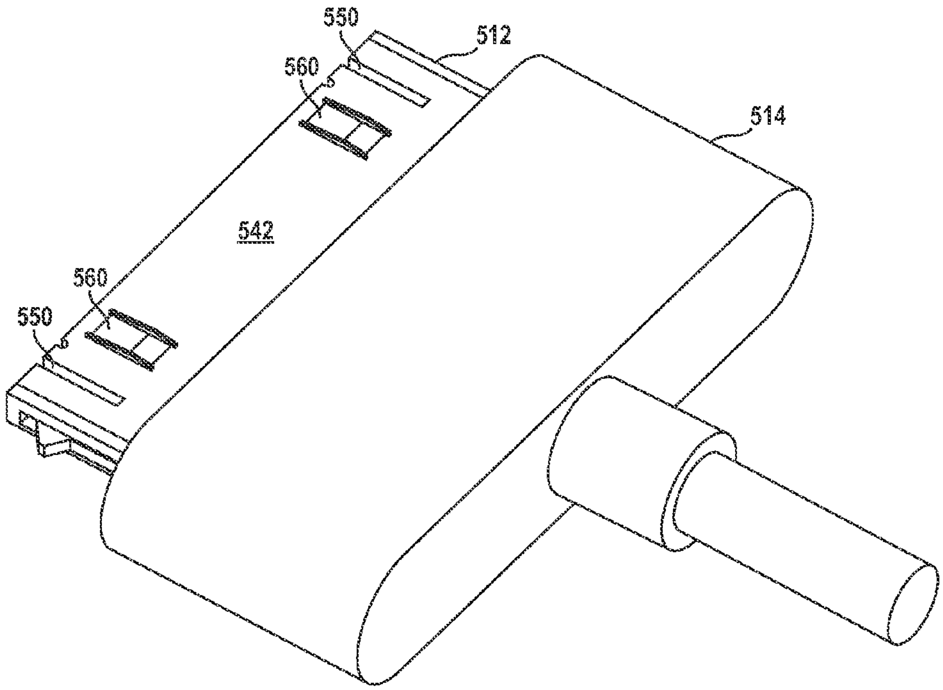
FIGS. 5A and 5B respectively are perspective views of an accessory connector and the accessory connector being mated with the mobile device connector shown in FIG. 4 in accordance with an embodiment of the invention.
Figure 6:
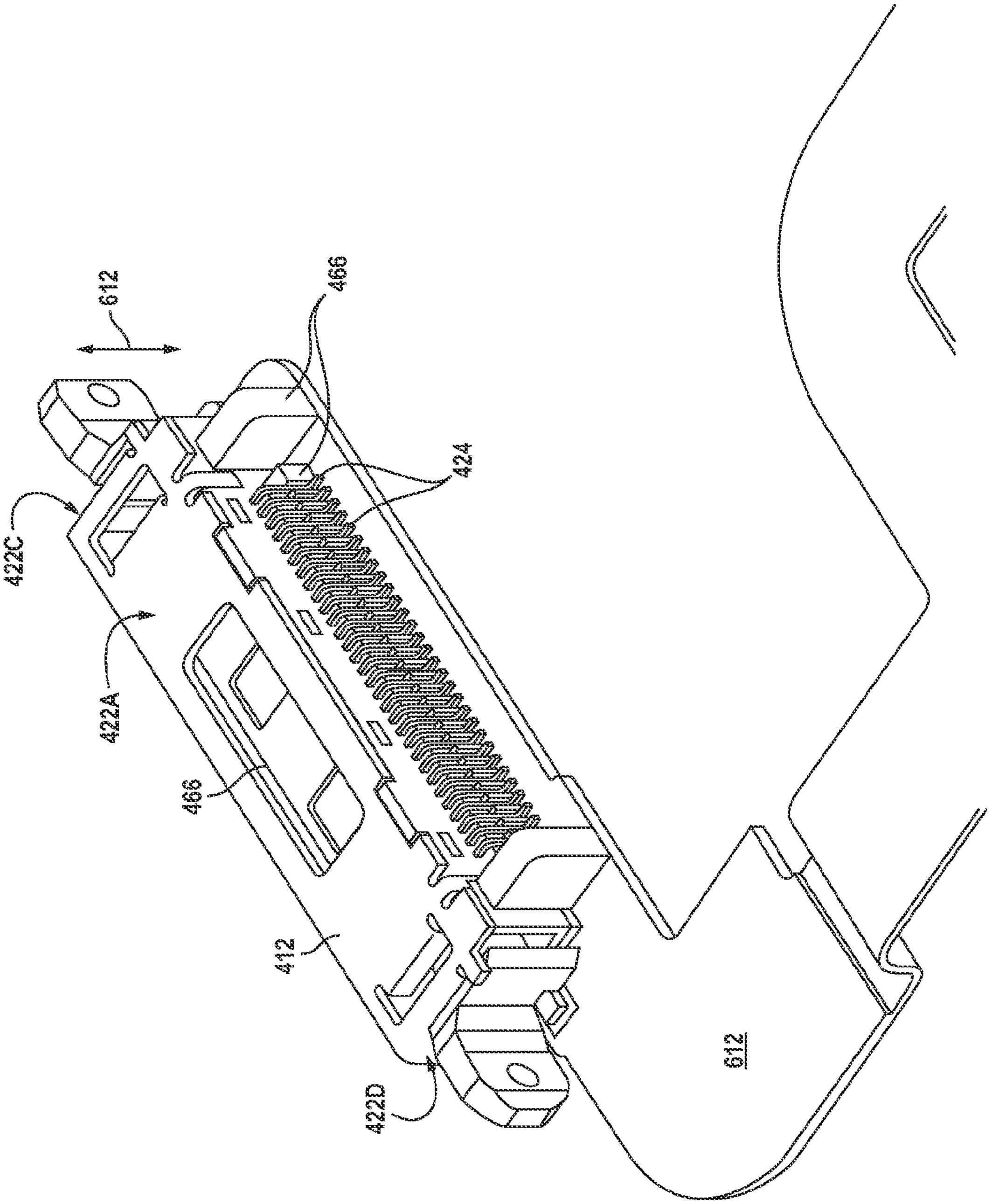
FIG. 6 shows perspective view of a back side of an exemplary mobile device connector mounted on a flex circuit in accordance with an embodiment of the invention.

FIG. 4 is a perspective view of a front side of an exemplary connector 412 which may be used as the connector 312 in FIG. 3. FIG. 6 is a perspective view of the back side of connector 412 which can be mounted on a flex circuit 612. The "front side" of connector 412 refers to the side through which an external connector may be mated with connector 412, and the "back side" of connector 412 refers to the side which faces the interior of handheld device 100. FIG. 5A shows a perspective view of an external connector 512 that can be secured to a plug assembly 514 of a cable. External connector 512 may also be secured to other types of accessories and media devices. For example, external connector 512 may be integrated in a stand-alone docking station, a cradle or a Hi-Fi system with integrated docking capability. Hereinafter, connector 412 will be referred to as the "portable device connector," and external connector 512 will be referred to as the "accessory connector."

In FIG. 4, portable device connector 412 can include a relatively flat box-shape shell 422 comprising a conductive material (e.g., a metal). Disposed in shell 422 can be a number of pins or elongated electrodes 424 which may be made available for electrical connectivity along both the front side and back side of connector 412. The pins may be held securely in place by an insulating material 466. The backside perspective view in FIG. 6 more clearly shows both the pins 424 and the insulating material 466. As can be seen, pins 424 can be positioned in vertically extending grooves (i.e., along axis 612) formed in insulating material 466, and can thus be securely held in place. In the front perspective view in FIG. 4, pins 424 (not visible) can be positioned in horizontally extending grooves (i.e., along axis 472) formed in insulating material 466. The ends of the grooves in insulating material 466 can be seen in FIG. 4.

While the back perspective view in FIG. 6 shows connector 412 to have a specific number of pins, the invention is not limited as such. In one embodiment, connector 412 may be a multi-purpose 30 pin connector with the pin assignment and functions as outlined in the table in FIG. 11. This particular pin out which advantageously can make handheld device 100 compatible with different types of interfaces, such as the USB and FireWire interfaces, is described more fully in application Ser. No. 11/519,541, filed Sep. 11, 2006, which disclosure is incorporated herein by reference in its entirety.

Referring back to FIG. 4, shell 422 of connector 412 comprises an upper shell plate 422A, a lower shell plate 422B, and two side shell plates 422C and 422D, thus forming a box shape with open front and back sides. In the upper shell plate 422A, engagement projections 430 can be located near each end and extend between the front and back faces of connector (i.e., along axis 472). Each of engagement projections 430 can be formed by cutting the top shell plate 422A in an angled C shape, and the resulting tongue pieces may be bent inward toward the interior of shell 422.

In FIG. 5A, accessory connector 512 can include a shell 542 which is also box shaped and is sized slightly smaller than shell 422 of portable device connector 412 so that accessory connector 512 can be fitted in portable device connector 412 through the front opening of portable device connector 412. Shell 542 of accessory connector 512 can include two engagement slits 550 which positionally correspond to and can be slightly larger in length than engagement projections 430 of portable device connector 412. Shell 542 can include raised springy holders 560 formed by notching the top shell plate of shell 542 outwardly.

Figure 5B:
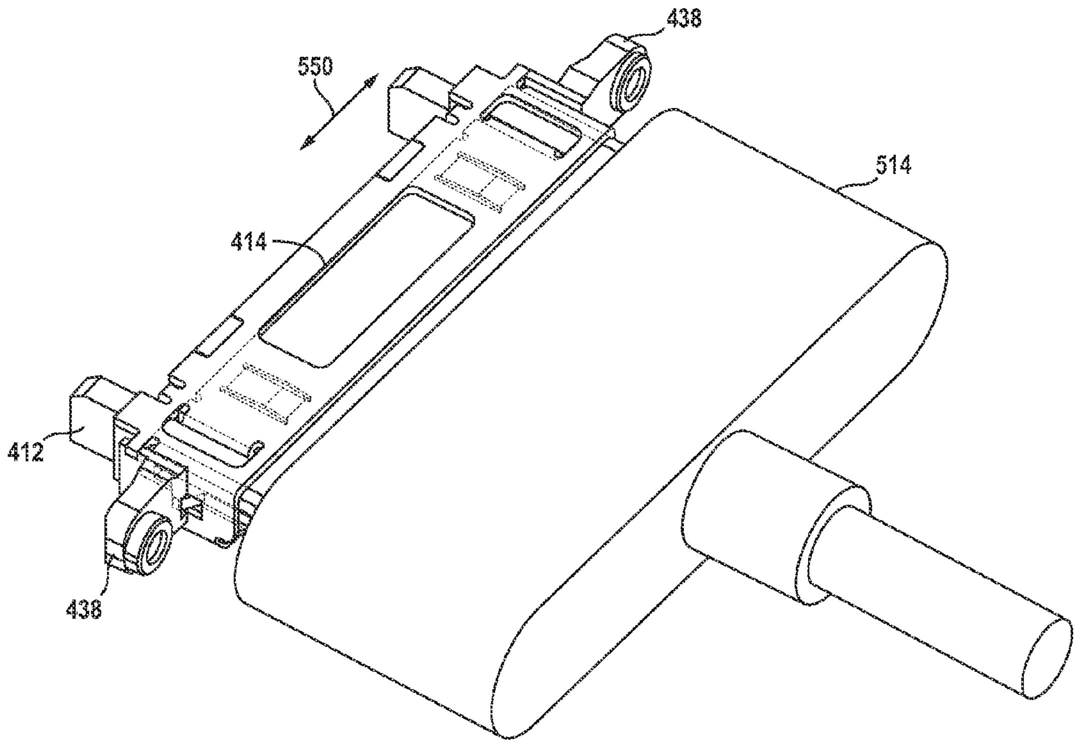

Connectors 412 and 512 can be mated by inserting accessory connector 542 through the front opening of portable device connector 412, as shown in FIG. 5B. Engagement projections 430 of portable device connector 412 can serve as guides for engagement slits 550 during insertion, thus ensuring proper alignment of the pins on the two connectors. When fully engaged, raised springy holders 560 can hold accessory connector 512 in place by pressing against the inside surface of the top shell plate 422A of portable device connector 412. Shell 422 can be tied to the frame of media device 100 via anchors 438 and can thus be grounded. Raised springy holders 560 may be from a conductive material, and when in contact with shell 422 can serve as grounding tabs for accessory connector 512. In one embodiment, except for opening 414 in portable device connector 412, the portable device connector 412 and accessory connector 512 are respectively similar (in structure) to connectors 20 and 40 disclosed in U.S. Pat. No. 6,776,660 issued Aug. 17, 2004 and titled "Connector," which disclosure is incorporated herein by reference in its entirety for all purposes.

For the connector system depicted by FIGS. 5A, 5B, the size of opening 414 along dimension 550 (FIG. 5B) may be limited by the location of raised springy holders 560. In one variation of the connector system of FIGS. 5A, 5B, the raised springy holders 560 can be positioned on the bottom side of accessory connector 512, thereby allowing opening 414 to be extended along the dimension 550. This would further reduce the amount of metal in the upper shell plate 422A of portable device connector 412, and thus further reduce the interference with the antenna operation. In an alternate variation, opening 414 may be filled with a plastic material or covered by a plastic label to prevent dust and other environmental elements from entering the interior of portable device 100 through opening 414. While opening 414 is shown to have a rectangular shape, it may alternatively have other suitable geometrical shapes, such as a circle, square, oval, diamond, hexagon or other multi-sided shapes.

Figure 10:
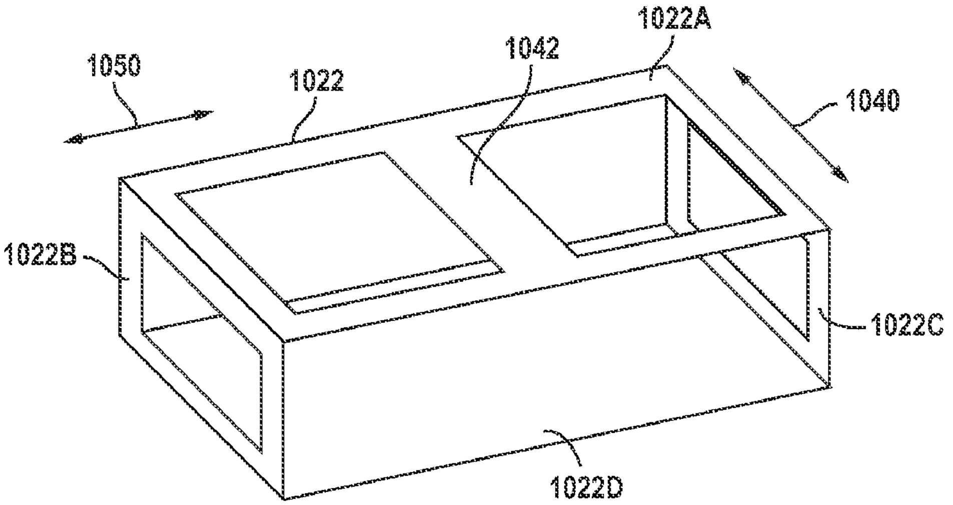
FIG. 10 is a perspective view of a mobile device connector shell in accordance with an embodiment of the invention.

In accordance with yet another embodiment shown in FIG. 10, openings can be formed in the upper plate 1022A of the shell as well as in side plates 1022B, 1022C, with the lower plate 1022D remaining as a uniform piece of conductive material to ensure robust structural support for the connector. Bottom shell plate 1022D could be used for securing connector shell 1022 to the frame of handheld device 100, and also serve as the plate against which raised springy holders of an accessory connector can press for purposes of holding the accessory connector tightly in place. As shown in FIG. 10, a bridge section 1042 along the dimension 1040 can be formed in the shell top plate 1022A to strengthen the connector structure if desired. Alternatively, multiple thinner bridges can be formed along the dimension 1040. In yet another variation, bridges extending along dimension 1050 (i.e., perpendicular to bridge 1042) or bridges extending along both dimensions 1040 and 1050 may be formed. Still other variations of the connector shell structure may include forming the shell upper plate 1022A and side plates 1022B, 1022C from a strong non-conductive material (e.g., hard plastic) that is securely coupled to a metallic bottom plate 1022D, or shell side plates 1022B, 1022C together with the lower plate 1022D can form a continuous piece of conductive material with openings formed in the shell side plates 1022B, 1022C, and the top shell plate may be made of a strong non-conductive material. Many other variations and alternatives can be envisioned by one skilled in this art in view of this disclosure. Further, the invention is not limited to the particular connector design depicted in FIGS. 4 and 6, and may be implemented in any connector with a conductive shell that is located in close proximity to one or more antennas.

Referring back to FIG. 3, the printed circuit board (PCB) which has various ICs attached thereto may be formed in an upper portion of handheld device 100 away from the base where the antenna(s) resides. This is advantageous in that the conductive shielding typically surrounding the PCB is far from the antenna(s) thus preventing the PCB shielding from interfering with the antenna operation. Substrate 318 (e.g., a flex circuit) may include a plurality of conductive traces which can electrically couple one or more pins of connector 312 with electronic components on PCB 316. Typically, the substrate extends between the connector and the PCB directly through the mid-section of portable device 100. However, with the antenna(s) located at the base of the portable device, the substrate could interfere with the operation of the antenna (s). In accordance with an embodiment of the invention, interference with the antenna(s) can be reduced by routing the flex circuit through an end of the connector (i.e., along an end plate as depicted in FIG. 3) rather than directly from its back side. This is more clearly shown in FIG. 6.

In FIG. 6, substrate 612 can extend under portable device connector 412 and out through an end plate 422D of connector 412. Pins 424 of connector 412 can make electrical connection with various conductive traces of flex circuit 612 which extend directly beneath the connector pins. Flex circuit 612 may include multiple layers of traces as needed. Various electronic components are typically mounted on the top side of the flex circuit. These electronic components (which may include capacitors, resistors and inductors) typically have conductive shielding surrounding them either individually or as a groups. The conductive shielding of the electronic components could interfere with proper operation of the antenna (s) if not positioned properly relative to the location of the antenna(s). In accordance with an embodiment of the invention, the electronic components can be attached to the underside of flex circuit 612 beneath connector 412. This is more clearly illustrated in FIG. 7.

Figure 7:
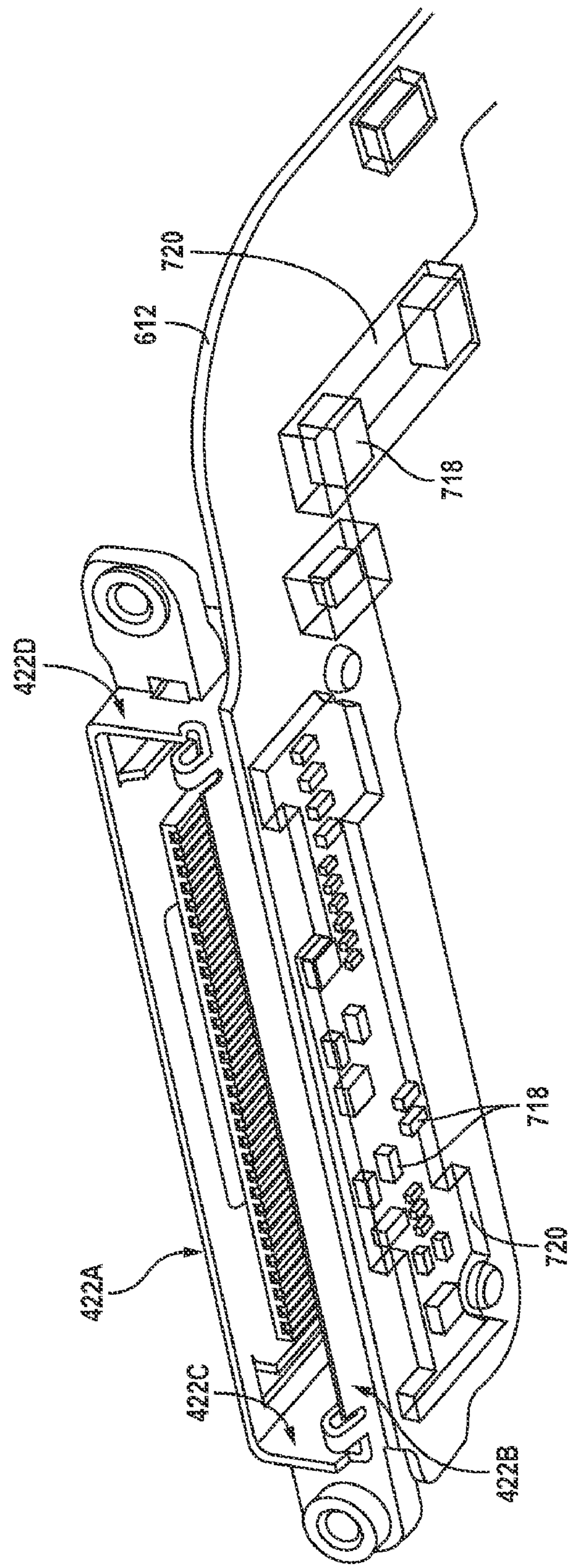
FIG. 7 shows a perspective view of an underside of the connector and flex circuit assembly of FIG. 6 in accordance with an embodiment of the invention.

FIG. 7 is a perspective view of an underside of connector 412 as mounted on flex circuit 612. As shown, a number of electronic components 718 can be connected to the backside of flex circuit 612. One or more conductive shields 720 cover the electronic components. Shields 720 are shown as transparent to reveal the components inside. Many of the electronic components 718 can be positioned directly under connector 412, which helps reduce interference between the shields 720 and the antenna(s).

Figure 8:
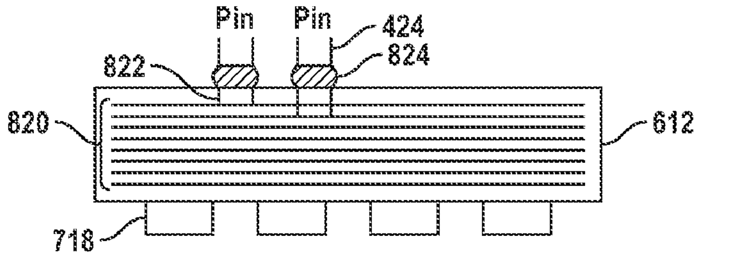
FIG. 8 is a cross section view of a portion of the flex circuit extending under the mobile device connector in accordance with an embodiment of the invention.

FIG. 8 shows a simplified cross section view of a portion of flex circuit 612 extending beneath the connector. Flex circuit 612 can include multiple layers of traces 820 insulated from one another by an insulating material. Pins 424 of connector 412 can be electrically connected to appropriate traces of flex circuit 612 through vias 822. Pins 424 can be connected to vias 822 using for example solder material 824. Electronic components 718 attached to the underside of flex circuit 612 can be electrically connected to appropriate traces of the flex circuit through vias (not shown). This particular stacking configuration is advantageous in minimizing interference with the operation of the antenna(s) as further illustrated in FIG. 9.

Figure 9:
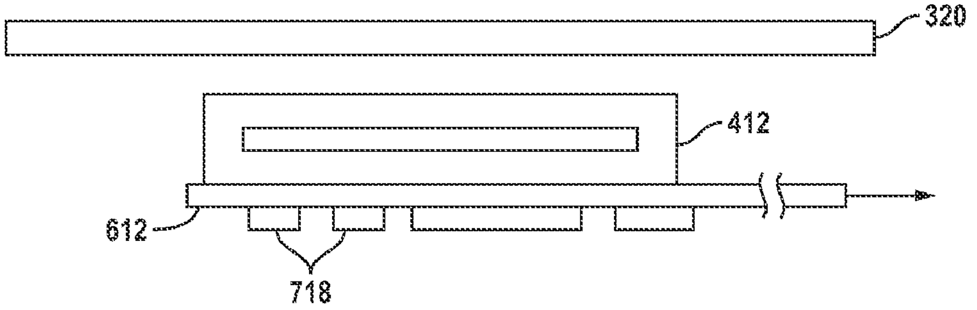
FIG. 9 is a cross section view showing the relative positions of the antenna(s), the connector, the flex circuit and the electronic components in accordance with an embodiment of the invention.

In FIG. 9, the stack comprises from top to bottom, antenna (s) 320, connector 412, flex circuit 612 and electronic components 718. Interference with the operation of the antenna(s) can be substantially reduced by (1) removing as much of the conductive material from the shell of connector 412, (2) routing flex circuit 318 through an end of connector 412 away from a central area of the antenna(s), and (3) attaching electronic components 718 to a bottom side of flex circuit 612 beneath connector 412. Note that the sizes and dimensions of the various components as well as the spacing between them as shown in FIG. 9 as well as all the other figures may not be to scale and are intended to be illustrative only.

Referring back to FIG. 3, a coaxial cable 322 can electrically connects antenna(s) 320 at the base of portable device 100 with PCB 316 at the top of device 100. Coaxial cable can have an outer conductor that can be connected to the ground terminal of the antenna(s) 320. Typically coaxial cable 322 has an outer protective covering. In accordance with an embodiment of the invention, the outer protective covering of coaxial cable 322 can be removed thereby exposing the outer conductor of the cable. This enables electrically connecting the outer conductor of the cable with the grounded frame of device 100 as shown by the four connection points 326, thus more robustly grounding the ground terminal of the antenna (s). Fewer or more than the four connection points may be used.

Figure 12:
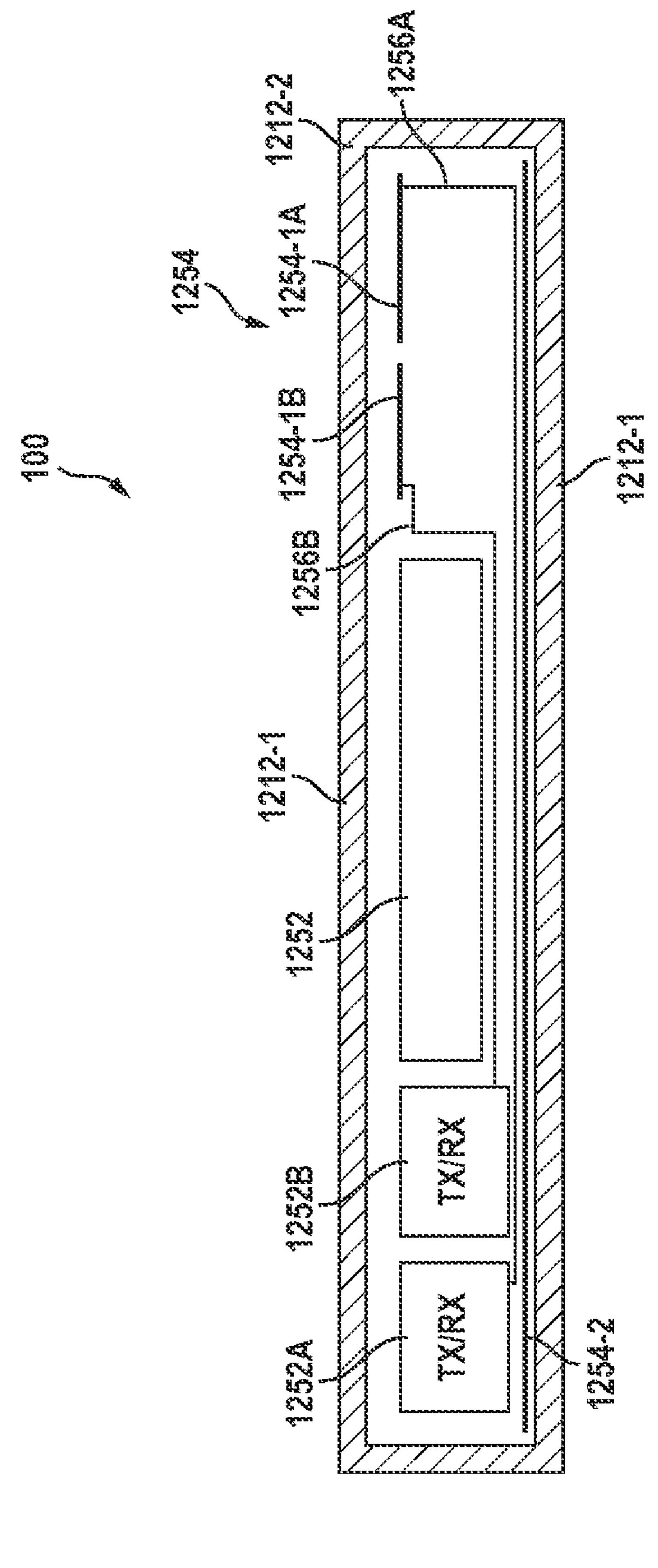
FIG. 12 is a cross-sectional side view of an illustrative handheld electronic device with an antenna system in accordance with an embodiment of the present invention.

FIGS. 12-16 will be used to describe exemplary antenna systems particularly suited for integration in the layout of device 100 shown FIG. 3. FIG. 12 shows a cross-sectional view of handheld device 100 with one exemplary antenna system. In the example of FIG. 12, device 100 has a housing that is formed of a conductive portion 1212-1 and a plastic portion 1212-2. Conductive portion 1212-1 may be any suitable conductor. With one suitable arrangement, case portion 1212-1 is formed from metals such as stamped 304 stainless steel. Stainless steel has a high conductivity and can be polished to a high-gloss finish so that it has an attractive appearance. If desired, other metals can be used for case portion 1212-1 such as aluminum, magnesium, titanium, alloys of these metals and other metals, etc.

Housing portion 1212-2 may be formed from a dielectric. An advantage of using dielectric for housing portion 1212-2 is that this allows antenna resonating elements 1254-1A and 1254-1B of antennas 1254 in device 100 to operate without interference from the metal sidewalls of housing 1212. With one suitable arrangement, housing portion 1212-2 is a plastic cap formed from a plastic based on acrylonitrile-butadiene-styrene copolymers (sometimes referred to as ABS plastic). These are merely illustrative housing materials for device 100. For example, the housing of device 100 may be formed substantially from plastic or other dielectrics, substantially from metal or other conductors, or from any other suitable materials or combinations of materials.

Components such as components 1252 may be mounted on one or more circuit boards in device 100. Typical components include integrated circuits, LCD screens, and user input interface buttons. Device 100 also typically includes a battery, which may be mounted along the rear face of housing as depicted for example in FIG. 3. Transceiver circuits 1252A and 1252B may also be mounted to one or more circuit boards such as PCB 316 in FIG. 3. If desired, there may be more transceivers. In a configuration for device 100 in which there are two antennas and two transceivers, each transceiver may be used to transmit radio-frequency signals through a respective antenna and may be used to receive radio-frequency signals through a respective antenna. For example, transceiver 1252A may be used to transmit and receive cellular telephone radio-frequency signals and transceiver 1252B may be used to transmit signals in a communications band such as the 3G data communications band at 2170 MHz band (commonly referred to as UMTS or Universal Mobile Telecommunications System), the WiFi® (IEEE 802.11) bands at 2.4 GHz and 5.0 GHz, the Bluetooth® band at 2.4 GHz, or the global positioning system (GPS) band at 1550 MHz.

The circuit board(s) in device 100 may be formed from any suitable materials. With one illustrative arrangement, device 100 is provided with a multilayer printed circuit board. At least one of the layers may have large uninterrupted planar regions of conductor that form a ground plane such as ground plane 1254-2. In a typical scenario, ground plane 1254-2 is a rectangle that conforms to the generally rectangular shape of housing 1212 and device 100 and matches the rectangular lateral dimensions of housing 1212. Ground plane 1254-2 may, if desired, be electrically connected to conductive housing portion 1212-1.

Suitable circuit board materials for the multilayer printed circuit board may include paper impregnated with phonolic resin, resins reinforced with glass fibers such as fiberglass mat impregnated with epoxy resin (sometimes referred to as FR-4), plastics, polytetrafluoroethylene, polystyrene, polyimide, and ceramics. Circuit boards fabricated from materials such as FR-4 are commonly available, are not cost-prohibitive, and can be fabricated with multiple layers of metal (e.g., four layers). So-called flex circuits, which may be formed using flexible circuit board materials such as polyimide, may also be used in device 10. For example, flex circuits may be used to form the antenna resonating elements for antennas 1254.

As shown in the illustrative configuration of FIG. 12, ground plane element 1254-2 and antenna resonating element 1254-1A may form a first antenna for device 100. Ground plane element 1254-2 and antenna resonating element 1254-1B may form a second antenna for device 100. If desired, other antennas can be provided for device 100 in addition to these two antennas. Such additional antennas may, if desired, be configured to provide additional gain for an overlapping frequency band of interest (i.e., a band at which one of these antennas 1254 is operating) or may be used to provide coverage in a different frequency band of interest (i.e., a band outside of the range of antennas 1254). Alternatively, only one antenna (e.g., ground plane element 1254-2 and resonating element 1254-1B) may be used. As shown in FIG. 12, resonating elements 1256A and 1256B can be located at the base of handheld device 100 where the connector (not shown) is also located. The connector can be oriented such that the opening in the conductive material of the connector shell (e.g., opening 314 in FIG. 3) would be facing resonating elements 1256A and 1256B so as to reduce interference with the operation of resonating elements 1256A and 1256B.

Any suitable conductive materials may be used to form ground plane element 1254-2 and resonating elements 1254-1A and 1254-1B in the antennas. Examples of suitable conductive materials for the antennas include metals, such as copper, brass, silver, and gold. Conductors other than metals may also be used, if desired. The conductive elements in antennas 1254 are typically thin (e.g., about 0.2 mm).

Transceiver circuits 1252A and 1252B (i.e., transceiver circuitry in block 244 of FIG. 2) may be provided in the form of one or more integrated circuits and associated discrete components (e.g., filtering components). These transceiver circuits may include one or more transmitter integrated circuits, one or more receiver integrated circuits, switching circuitry, amplifiers, etc. Transceiver circuits 1252A and 1252B may operate simultaneously (e.g., one can transmit while the other receives, both can transmit at the same time, or both can receive simultaneously).

Each transceiver may have an associated coaxial cable or other transmission line over which transmitted and received radio frequency signals are conveyed. As shown in the example of FIG. 12, transmission line 1256A (e.g., a coaxial cable) may be used to interconnect transceiver 1252A and antenna resonating element 1254-1A and transmission line 1256B (e.g., a coaxial cable) may be used to interconnect transceiver 1252B and antenna resonating element 1254-1B. With this type of configuration, transceiver 1252B may handle WiFi transmissions over an antenna formed from resonating element 1254-1B and ground plane 1254-2, while transceiver 1252A may handle cellular telephone transmission over an antenna formed from resonating element 1254-1A and ground plane 1254-2. One or both transmission lines 1256A and 1256B may be a coaxial cable with its outer protective covering removed to expose the outer conductor of the cable. Similar to coaxial cable 322 in FIG. 3, this enables the outer conductor of the coaxial cable (typically connected to the ground terminal of the antenna) to be electrically connected to the conductive portion 1212-1 of the housing thus providing a more robust (i.e., less resistive) ground path.

Figure 13:
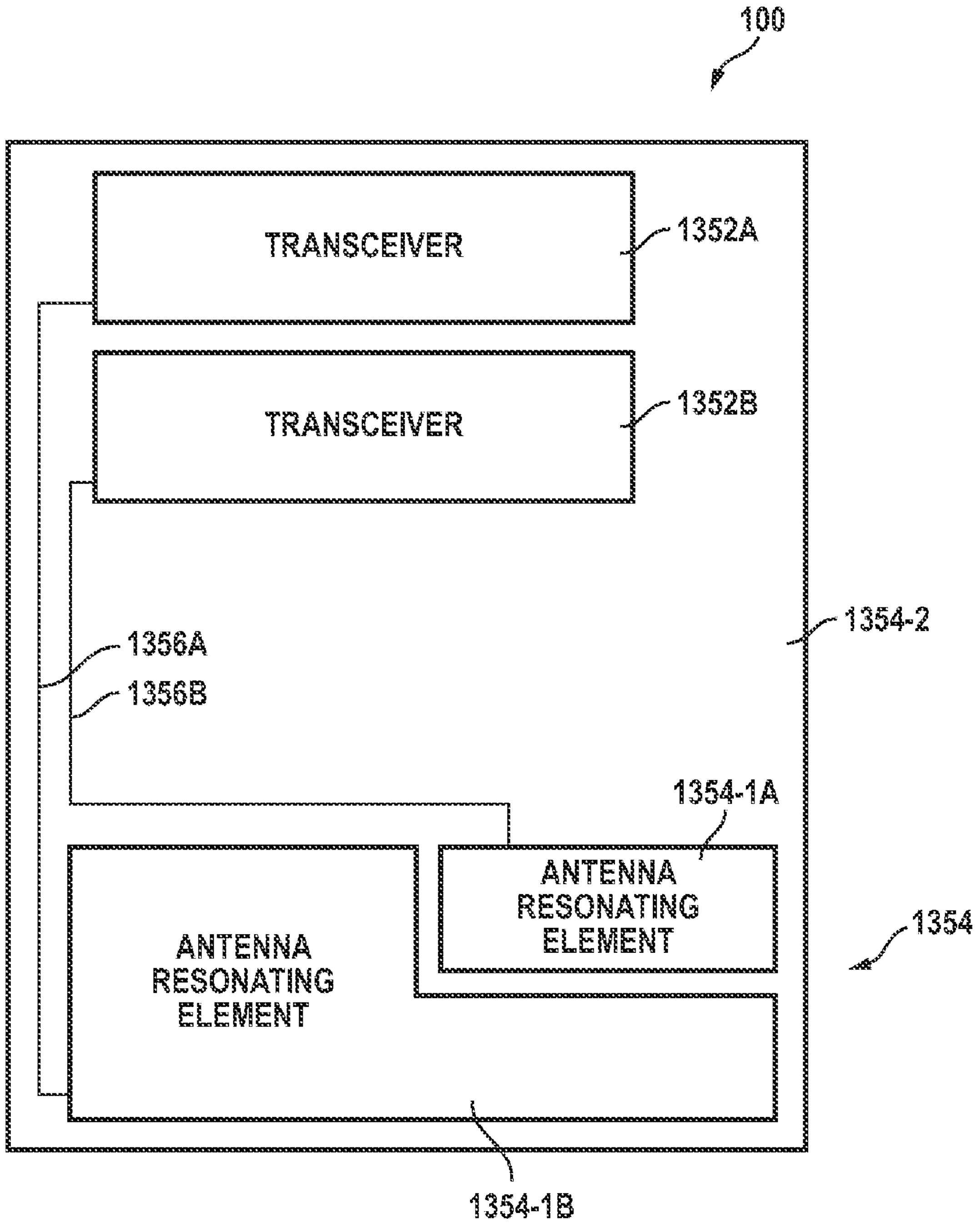
FIG. 13 is a schematic top view of an illustrative handheld electronic device containing two radio-frequency transceivers that may be coupled to two associated antenna resonating elements by respective transmission lines in accordance with an embodiment of the present invention.

A top view of an illustrative device 100 is shown in FIG. 13. As shown, transceiver circuitry such as transceiver 1352A and transceiver 1352B may be interconnected with antenna resonating elements 1354-1A and 1354-1B over respective transmission lines 1356A and 1356B. Ground plane 1354-2 may have a substantially rectangular shape (i.e., the lateral dimensions of ground plane 1354-2 may match those of device 100). Ground plane 1354-2 may be formed from one or more printed circuit board conductors, conductive housing portions (e.g., housing portion 1212-1 of FIG. 12), or any other suitable conductive structure. The connector (not shown) would be located directly underneath resonating elements 1354-1A and 1354-1B with the opening in the conductive material of the connector shell facing the resonating elements.

Antenna resonating elements 1354-1A and 1354-1B and ground plane 1354-2 may be formed in any suitable shapes. With one illustrative arrangement, one of antennas 1354 (i.e., the antenna formed from resonating element 1354-1A) is based at least partly on a planar inverted-F antenna (PIFA) structure and the other antenna (i.e., the antenna formed from resonating element 1354-1B) is based on a planar strip configuration. Although this embodiment may be described herein as an example, any other suitable shapes may be used for resonating element 1354-1A and 1354-1B if desired.

Figure 14:
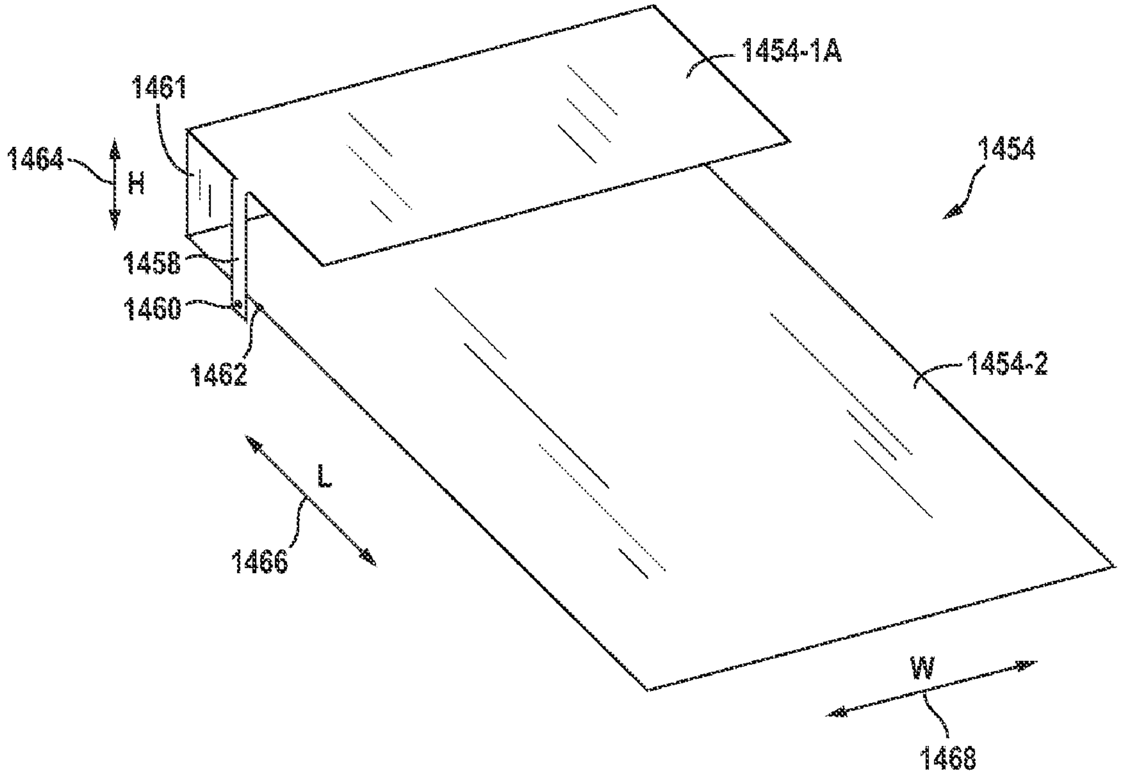
FIG. 14 is a perspective view of an illustrative planar inverted-F antenna (PIFA) which may be suitable for integration with the device in FIG. 3 in accordance with an embodiment of the present invention.

An illustrative PIFA structure that may be used in device 100 is shown in FIG. 14. As shown, PIFA structure 1454 may have a ground plane portion 1454-2 and a planar resonating element portion 1454-1. Antennas are fed using positive signals and ground signals. The portion of an antenna to which the positive signal is provided is sometimes referred to as the antenna's positive terminal or feed terminal. This terminal is also sometimes referred to as the signal terminal or the center-conductor terminal of the antenna. The portion of an antenna to which the ground signal is provided may be referred to as the antenna's ground, the antenna's ground terminal, the antenna's ground plane, etc. In antenna 1454, feed conductor 1458 is used to route positive antenna signals from signal terminal 1460 into antenna resonating element 1454-1. Ground terminal 1462 is shorted to ground plane 1454-2, which forms the antenna's ground.

The dimensions of the ground plane in a PIFA antenna such as antenna 1454 are generally sized to conform to the maximum size allowed by the housing of device 100. Antenna ground plane 1454-2 may be rectangular in shape having width W in lateral dimension 1468 and length L in lateral dimension 1466. The length of antenna 1454 in dimension 1466 affects its frequency of operation. Dimensions 1468 and 1466 are sometimes referred to as horizontal dimensions. Resonating element 1454-1 is typically spaced several millimeters from ground plane 1454-2 along vertical dimension 1464. The size of antenna 1454 in dimension 1464 is sometimes referred to as height H of antenna 1454.

Figure 15:
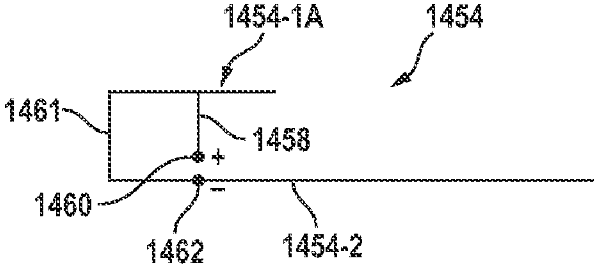
FIG. 15 is a cross-sectional side view of an illustrative planar inverted-F antenna of the type shown in FIG. 14 in accordance with an embodiment of the present invention.

A cross-sectional view of PIFA antenna 1454 of FIG. 14 is shown in FIG. 15. As shown, radio-frequency signals may be fed to antenna 1454 (when transmitting) and may be received from antenna 1454 (when receiving) using signal terminal 1460 and ground terminal 1462. In a typical arrangement, a coaxial conductor or other transmission line has its center conductor electrically connected to point 1460 and its ground conductor electrically connected to point 1462.

The height H of antenna 1454 of FIGS. 14 and 15 in dimension 1464 is limited by the amount of near-field coupling between resonating element 1454-1A and ground plane 1454-2. For a specified antenna bandwidth and gain, it is not possible to reduce the height H without adversely affecting performance. All other variables being equal, reducing height H will cause the bandwidth and gain of antenna 1454 to be reduced.

Figure 16:
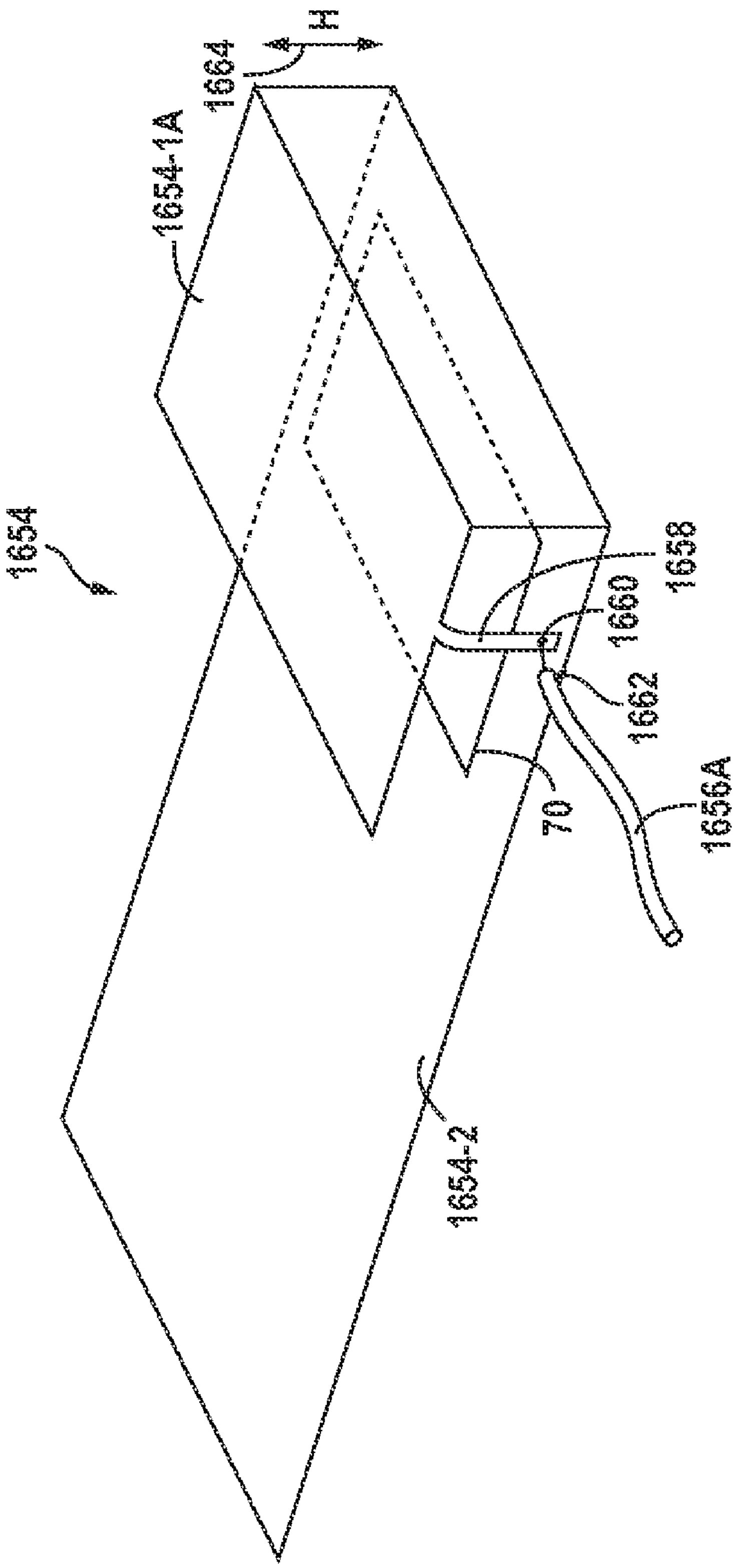
FIG. 16 is a perspective view of an illustrative planar inverted-F antenna in which a portion of the antenna's ground plane underneath the antenna's resonating element may be removed to form a slot in accordance with an embodiment of the present invention.

As shown in FIG. 16, the minimum vertical dimension of the PIFA antenna can be reduced while still satisfying minimum bandwidth and gain constraints by introducing an opening 1670 in the area under antenna resonating element 1654-1A. Opening 1670 may be filled with plastic, or any other suitable dielectric. Multiple smaller openings may be formed in ground plane 1654-2 instead of one bigger opening. These openings may be square, circular, oval, polygonal or other geometric shapes, and may extend though adjacent conductive structures in the vicinity of ground plane 1654-2. With one suitable arrangement, which is shown in FIG. 16, opening 1670 is rectangular and forms a slot. The slot may be any suitable size. For example, the slot may be slightly smaller than the outermost rectangular outline of resonating elements 1354-1A and 1354-2 as viewed from the top view orientation of FIG. 13. Typical resonating element lateral dimensions are on the order of 0.5 cm to 10 cm.

The presence of slot 1670 reduces near-field electromagnetic coupling between resonating element 1654-1A and ground plane 1654-2 and allows height H in vertical dimension 1664 to be made smaller than would otherwise be possible while satisfying a given set of bandwidth and gain constraints. For example, height H may be in the range of 1-5 mm, may be in the range of 2-5 mm, may be in the range of 2-4 mm, may be in the range of 1-3 mm, may be in the range of 1-4 mm, may be in the range of 1-10 mm, may be lower than 10 mm, may be lower than 4 mm, may be lower than 3 mm, may be lower than 2 mm, or may be in any other suitable range of vertical displacements above ground plane element 1654-2.

If desired, the portion of ground plane 1654-2 that contains slot 1670 may be used to form a slot antenna. The slot antenna structure may be used at the same time as the PIFA structure to form a hybrid antenna 1654. By operating antenna 1654 so that it exhibits both PIFA operating characteristics and slot antenna operating characteristics, antenna performance can be improved.

The exemplary antenna systems depicted by FIGS. 12-16 and other exemplary antenna systems suitable for integration with the particular device layout out shown in FIG. 3 are more fully described in the commonly assigned patent application Ser. No. 11/650,071, filed Jan. 4, 2007, titled "Handheld Electronic Devices with Isolated Antennas," with inventors Robert W. Schlub et al., which disclosure is incorporated herein by reference in its entirety. Other exemplary antenna systems also suitable for integration with the particular device layout out shown in FIG. 3 are described in the commonly assigned patent application Ser. No. 11/650,187, filed Jan. 4, 2007, titled "Antennas for Handheld Electronic Devices," with inventors Robert J. Hiu et al., which disclosure is incorporated herein by reference in its entirety.

The foregoing is merely illustrative of the principles of this invention and various modifications can be made by those skilled in the art in view of this disclosure without departing from the scope and spirit of the invention.

What is claimed is:

1. A handheld device comprising:

one or more antennas disposed at a base of the handheld device; and a connector disposed at the base of the handheld device and configured to couple with one or more external accessories, the connector having a shell comprising a conductive material, wherein the connector shell includes at least one or more openings in a portion of the conductive material to reduce electromagnetic interference between the connector shell and the one or more antennas;

wherein the connector shell includes an upper plate, a lower plate and two side plates with the upper plate disposed between the lower plate and the one or more antennas, and wherein the one or more openings in the portion of the conductive material is in the upper plate.

2. The handheld device of claim 1, wherein the at least one opening in a portion of the conductive material is on a side of the connector shell facing the one or more antennas.

3. The handheld device of claim 1, wherein the conductive material along each end plate of the connector shell includes at least one opening.

4. The handheld device of claim 1 further comprising a flex circuit configured to make electrical contact with one or more pins of the connector along the lower plate of the connector shell, the flex circuit extending out from under the connector along one of the two side plates.

5. The handheld device of claim 1 further comprising: a flex circuit making electrical contact with one or more pins of the connector along the lower plate of the connector shell; and a plurality of electronic components coupled to the flex circuit directly beneath the connector, whereby the one or more antennas extend over the connector, the connector extends over the flex circuit, and the flex circuit extends over the electronic components.

6. The handheld device of claim 1, wherein the at least one opening is covered by a non-conductive material.

7. The handheld device of claim 1, wherein the connector is configured to facilitate docking of the handheld device in a docking system.

8. The handheld device of claim 1, wherein the connector is positioned between the one or more antennas and a front face of thehandheld device where a keypad is located.

9. The handheld device of claim 1 wherein the handheld device is configured such that when it is used as a cellular phone, the base of the handheld device is away from user's head.

10. The handheld device of claim 1 further comprising;

a conductive frame;

a circuit board; and a coaxial cable configured to electrically couple the one or more antennas with one or more electronic components on the circuit board, wherein the coaxial cable has an external conductor that is exposed along at least a predetermined length of the coaxial cable, the external conductor of the coaxial cable being electrically connected to the conductive frame.

11. A handheld device comprising:

one or more antennas disposed at a base of the handheld device;

a connector disposed at the base of the handheld device and configured to couple with one or more external accessories, the connector having a shell comprising a conductive material, the connector shell having an upper plate, a lower plate and two side plates; and a substrate configured to provide electrical connection between one or more pins of the connector and at least one electronic component disposed in the handheld device, wherein the substrate extends out from under the lower plate and along one of the two side plates;

wherein the upper plate is disposed between the lower plate and the one or more antennas, and wherein the connector shell includes at least one opening in the conductive material along the upper plate to reduce electromagnetic interference between the connector shell and the one or more antennas.

12. The handheld device of claim 11, wherein the connector is configured to facilitate docking of the handheld device in a docking system.

13. The handheld device of claim 11, wherein the connector is positioned between the one or more antennas and a front face of the handheld device where a keypad is located.

14. The handheld device of claim 11 wherein the handheld device is configured such that when it is used as a cellular phone, the base of the handheld device is away from user's head.

15. The handheld device of claim 11 wherein the substrate is a flex circuit having multiple layers of interconnect traces.

16. The handheld device of claim 11 further comprising a plurality of electronic components coupled to the substrate directly beneath the connector, whereby the one or more antennas extend over the connector, the connector extends over the substrate, and the substrate extends over the electronic components.

17. The handheld device of claim 11 further comprising;

a conductive frame;

a circuit board; and a coaxial cable configured to electrically couple the one or more antennas with one or more electronic components on the circuit board, wherein the coaxial cable has an external conductor that is exposed along at least a predetermined length of the coaxial cable, the external conductor of the coaxial cable being electrically connected to the conductive frame.

18. A handheld device comprising:

one or more antennas disposed at a base of the handheld device;

a connector disposed at the base of the handheld device and configured to couple with one or more external accessories;

a substrate configured to provide electrical connection between one or more pins of the connector and at least one electronic component disposed in the handheld device; and a plurality of electronic components coupled to the substrate such that the connector extends between the plurality of electronic components and the one or more antennas;

wherein the connector has a shell comprising a conductive material, the connector shell having an upper plate, a lower plate and two side plates, the upper plate disposed between the lower plate and the one or more antennas, and wherein the connector shell includes at least one opening in the conductive material along the upper plate to reduce electromagnetic interference between the connector shell and the one or more antennas.

19. The handheld device of claim 18, wherein the connector is configured to facilitate docking of the handheld device in a docking system.

20. The handheld device of claim 18, wherein the connector is positioned between the one or more antennas and a front face of the handheld device where a keypad is located.

21. The handheld device of claim 18 wherein the handheld device is configured such that when it is used as a cellular phone, the base of the handheld device is away from user's head.

22. The handheld device of claim 18 wherein the substrate is a flex circuit having multiple layers of interconnect traces.

23. The handheld device of claim 18 wherein the one or more antennas extend over the connector, the connector extends over a portion of the substrate, and the substrate extends over the electronic components.

24. The handheld device of claim 18 further comprising;

a conductive frame;

a circuit board; and a coaxial cable configured to electrically couple the one or more antennas with one or more electronic components on the circuit board, wherein the coaxial cable has an external conductor that is exposed along at least a predetermined length of the coaxial cable, the external conductor of the coaxial cable being electrically connected to the conductive frame.

* * * * *